United States Patent [19]

Grischkowsky et al.

[11] 4,264,877
[45] Apr. 28, 1981

[54] APPARATUS FOR PRODUCING TUNABLE INTENSE COHERENT RADIATION IN THE VICINITY 628 CM.$^{-1}$

[75] Inventors: Daniel R. Grischkowsky, Peekskill; Rodney T. Hodgson, Somers; Peter P. Sorokin, Ossining, all of N.Y.

[73] Assignee: International Business Machines Corporation, Armonk, N.Y.

[21] Appl. No.: 879,528

[22] Filed: Feb. 21, 1978

Related U.S. Application Data

[63] Continuation of Ser. No. 687,803, May 19, 1976, abandoned.

[51] Int. Cl.$^2$ .............................................. H01S 3/22
[52] U.S. Cl. ........................... 331/94.5 G; 331/94.5 L; 331/94.5 P
[58] Field of Search ...................... 331/94.5 C, 94.5 G, 331/94.5 L, 94.5 P, 94.5 D; 330/4.3

[56] References Cited

U.S. PATENT DOCUMENTS

| | | | |
|---|---|---|---|
| 3,443,087 | 5/1969 | Robieux | 250/284 |
| 3,835,416 | 9/1974 | Schlossberg et al. | 331/94.5 P |
| 3,937,956 | 2/1976 | Lyon | 250/283 |
| 4,009,391 | 2/1977 | Janes et al. | 250/284 |
| 4,151,486 | 4/1979 | Itzkan et al. | 331/94.5 G |

OTHER PUBLICATIONS

Sorokin et al., J. Chem. Phys., vol. 54, No. 5 (Mar. 1, 1971) pp. 2184-2190.
Sorokin et al., Phys. Rev., vol. 186, No. 2 (Ovy. 10, 1969) pp. 342-343.
Sorokin et al., Appl. Phys. Letts., vol. 22, No. 7 (Apr. 1, 1973) pp. 342-344.

Primary Examiner—William L. Sikes
Attorney, Agent, or Firm—Pollock, Vande Sande & Priddy

[57] ABSTRACT

Apparatus for producing tunable intense coherent radiation at approximately 628 cm.$^{-1}$ with a line width less than 0.1 cm.$^{-1}$. The apparatus includes an optical cavity containing a vapor cell and pumping means including at least one optical pumping source for directing energy at the cavity. In one embodiment the cavity encloses a material capable of stimulated emission in response to said pumping. The material has at least three atomic energy levels with at least a first and second atomic energy level separated by a particular energy quantum approximately equal to 628 cm$^{-1}$; a transition from said first to said second atomic energy level favored over all other possible transitions from said first atomic energy level; said third atomic energy level, from which atoms can be pumped to said first atomic energy level in response to said pumping means. While this is consistent with classical laser operation the apparatus disclosed herein can also be used for stimulated Raman scattering. Tunability is achieved by tuning the pumping sources in the case of stimulated Raman scattering, or with the aid of the Zeeman or Stark effects for classical laser operation. Typical materials are potassium or strontium vapors. Several pumping arrangements are also disclosed.

26 Claims, 12 Drawing Figures

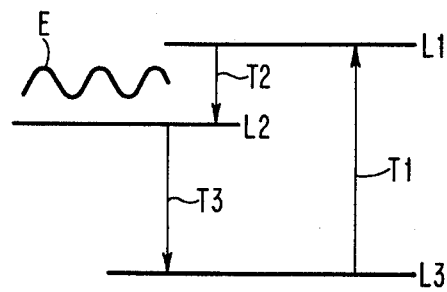
FIG. 1A
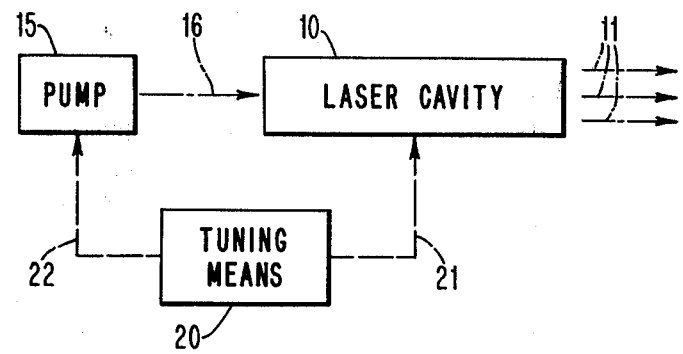
FIG. 1B
FIG. 2B
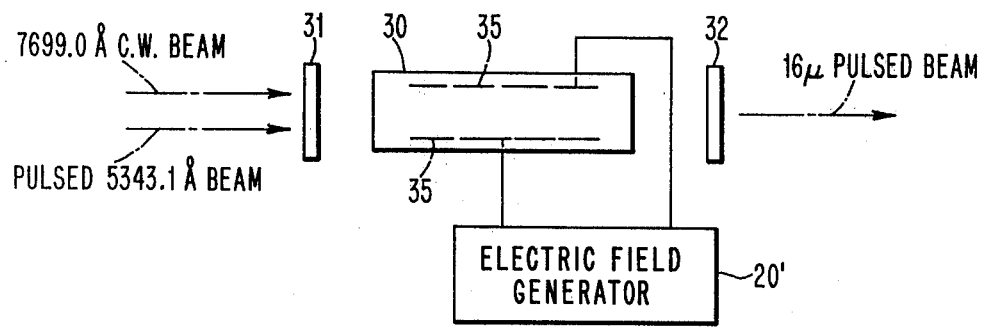

APPARATUS FOR PRODUCING TUNABLE INTENSE COHERENT RADIATION IN THE VICINITY 628 CM.$^{-1}$

This is a continuation of application Ser. No. 687,803, filed may 19, 1976 and now abondoned.

FIELD OF THE INVENTION

The present invention relates to apparatus for producing tunable intense coherent radiation in the vicinity of 628 cm.$^{-1}$.

BACKGROUND OF THE INVENTION

For a number of years, there has been interest in achieving a tunable intense source of coherent radiation in the vicinity of 628 cm.$^{-1}$. This interest arises from a number of schemes which have been proposed to separate various isotopes of uranium in a multi-step process, one of whose steps requires radiation at approximately 628 cm.$^{-1}$. In this regard, see U.S. Pat. Nos. 3,443,087 and 3,937,956, as well as "Photochemical Isotope Separation as Applied to Uranium" (Union Carbide Corporation, Nuclear Division, Oak Ridge Gaseous Diffusion Plant, Mar. 15, 1972. K-L-3054, Revision 1, page 29) and "Some Developments in Laser Isotope Separation Research at Los Alamos" by Robinson and Jensen (A-UR-76-191) submitted to the American Physical Society meeting February 2-5, 1976, New York, New York.

The prior art is replete with techniques for producing intense coherent radiation at a variety of wavelengths, and further illustrates examples of apparatus that can be employed to tune such radiation to specific wavelengths. There are even examples of lasers which emit in the vicinity of 628 cm.$^{-1}$. For example, Lyon mentions, in U.S. Pat. No. 3,937,956, an HF laser emitting at 629.16 cm.$^{-1}$. For one reason or another the prior art techniques have not achieved what is required for the IR radiation step in the processes illustrated by the references cited above.

It is, therefore, one object of the present invention to provide apparatus emitting tunable intense coherent radiation at approximately 628 cm.$^{-1}$. It is another object of the present invention to provide such apparatus which is capable of being used in one or more of the isotope separation processes disclosed in present invention to provide such radiation by a classical laser which establishes a population inversion and produces stimulated emission as the population inversion is depleted. It is a further object of the present invention to produce such radiation by employing stimulated Raman scattering. It will be apparent from a reading of this description how the invention achieves these and other objects, which other objects will become apparent as this description proceeds.

SUMMARY OF THE INVENTION

The present invention meets the foregoing requirements by providing a cavity, and pumping means including at least one optical pumping source (for example a laser) for directing energy at the cavity. Material in the vapor state is included within the cavity capable of stimulated emission at operating temperature and pressure in response to said pumping. The material has at least three atomic energy levels with at least a first and second atomic energy level separated by a particular energy quantum approximately equal to 628 cm.$^{-1}$. The transition, in such material from the first to second energy levels is favored over all other possible transitions from said first atomic energy level. The third atomic energy level is one from which atoms can be pumped to the first atomic energy level in response to the pumping means. Finally, the material has a vapor density sufficient for lasing in response to said pumping. Several specific embodiments of the invention are disclosed herein. In some of these embodiments classical laser techniques are employed whereby a population inversion is established in said first atomic energy level which, upon depletion, results in intense coherent radiation. With such embodiments tunability is achieved by employing either the Zeeman or Stark effects. Other embodiments of the invention rely upon the stimulated Raman scattering to produce the intense coherent radiation. For these embodiments tunability is achieved by tuning the pumping means.

Specific embodiments of the invention employ either potassium or strontium in the vapor phase as the lasing material.

BRIEF DESCRIPTION OF THE DRAWINGS

The following detailed description of the inention refers to the drawings appended hereto, in which like reference characters identify identical apparatus, and in which:

FIG. 1A is an energy level diagram and FIG. 1B is a schematic diagram of apparatus embodying our invention;

FIGS. 2B, 3,4, 5A and 5B are block diagram of apparatus embodying our invention;

DETAILED DESCRIPTION OF THE INVENTION

Figure 2A:
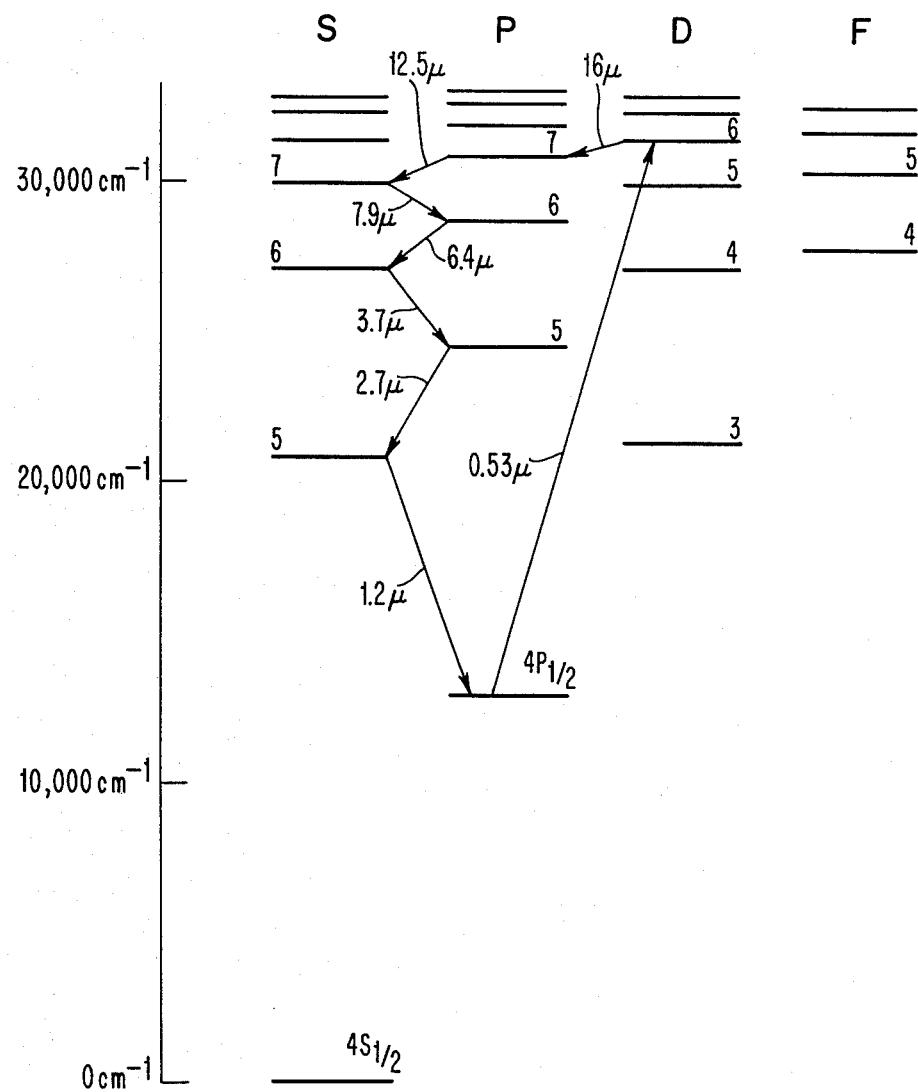
FIG. 2A is a specific energy level diagram for atomic K.

Classical laser operation requires a population inversion in which a higher energy level is more populated than a lower energy level.

Laser action was first established in an optical cavity which allowed photons to be reflected back and forth so as to build up the intensity of the radiation. Another type of laser does not require such an optical cavity as the photon amplification is so large that sufficient intensity is produced without the necessity of mirrors; this type of laser is referred to as "super-radiant."

A further technique for producing intense tunable coherent radiation is stimulated Raman scattering (hereinafter SRS). In employing SRS, an intense laser beam is converted into a beam of another frequency by coherent stimulation of a Raman or two (or more) step scattering processes.

Tuning a classical or super-radiant laser can be achieved with application of electric or magnetic fields to the lasing medium. Tuning an SRS device can be achieved by tuning the intense laser beam.

Our invention can employ either classical laser techniques (including super-radiant) or SRS to produce the desired result. Either technique requires optical pumping of a suitable medium. Due to the transparency of vapors (mediums in the gaseous phase) we prefer to use vapor media.

FIG. 1A illustrates, in schematic form, the essential atomic energy levels needed for materials used in applying the principles of this invention to emit at the desired wavelength. More particularly, FIG. 1A illustrates three of the atomic energy levels employed in the system. Those skilled in the art will understand that many other atomic energy levels may be available, lying either between the levels L3-L1, or outside these levels or both. These other levels, since they preferably do not take part in the operation, or if they do, they do not significantly take part, have been omitted from FIG. 1A for ease of illustration. As shown in FIG. 1A level L3 is the lowest energy level illustrated. Although this may, in fact, be the ground state for this atom, that is not necessarily the case. Rather, L3 may also comprise some intermediate excited level to which atoms must be pumped from the ground state. As is illustrated in FIG. 1, the essential transition of the process is the transition from L1 to L2 (Transition T2). Emission of radiation associated with this transition is indicated by wave E. In some embodiments of the invention it is necessary to establish a population inversion at L1, and for that reason, for those embodiments, L1 should be an energy level in which establishment of such a population inversion is possible. The transition from L3 to L1 is via absorption of photons from some pumping source. Typically, the source includes a laser. Stimulated emission occurs in Transition T2 to produce the desired intense coherent radiation. Transition T3 is desirable so that after the population inversion has been depleted (in those embodiments which establish such inversion), that is the Transistion T2, the atoms can again be pumped (Transition T1) back up to the excited level L1. Thus, one desirable requirement for the material employed is that there be no terminal energy levels between L2 and L3. The Transition T3, or the multiple transitions which make up T3, may also result in either spontaneous or stimulated emission. Depending on a variety of factors, the desired radiation may be c.w. or pulsed and, if pulsed, of varying pulse widths. Clearly, if transition T3 involves selftrapping levels some means must be provided to overcome this difficulty if the apparatus it to proivde long pulse widths or c.w. output. It is preferable that the transition T3 not involve self-trapping levels, althrough it will be understood that this is not essential.

In summary, the present invention is predicated on choosing material having at least three atomic energy levels, such as L1-L3 illustrated in FIG. 1A. To insure production of the desired radiation the transition from L1 to L2 should be the favored transition, among all possible transitions, from energy level L1. The energy quantum released upon stimulated emission from level L1 to L2 should be approximately that of the desired radiation, that is, approximately 628 cm.$^{-1}$. The transition from L2 to L3 may actually comprise one or more transitions. Similar to Transition T3, Transition T1 may, in fact, comprise multiple transitions so long as the net result is a strongly favored transition from level L3 to L1. If L3 is not the ground state of the atom, it should be a state which has a relatively long lifetime in comparison with the other steps in the process.

FIG. 1B illustrates apparatus for producing the atomic transitions illustrated in FIG. 1A to thereby produce the desired coherent radiation. More particularly, a laser cavity 10 is filled with a suitable medium and maintained by means well known to the art at suitable operating temperatures and pressures. A pumping source 15 provides energy, in the correct form, for exciting the medium contained in cavity 10. The pumping is schematically illustrated by the arrow 16, although those skilled in the art will understand that the pumping can be carried out with a variety of forms of energy, such as light (coherent or incoherent), electric and/or electro-magnetic. The arrows 11 associated with laser cavity 10 are intended to represent the emission of intense coherent radiation of the desired wavelength. In addition to the foregoing apparatus, FIG. 1B illustrates a tuning means which is connected, via dotted lines 21 and 22 to, respectively, laser cavity 10 and pump 15. Specifically, this portion of FIG. 1B illustrates that tuning means 20 is capable of tuning the desired wavelength either by affecting laser cavity 10 or by affecting pump 15 (or both).

Pump 15 is intended to represent one or more pumping devices. Specifically, it was mentioned with respect to FIG. 1A, that atomic energy level L3 need not be the ground state for the medium. If it is, then the pumping device included within the pump 15 is arranged so as to produce the Transition T1, that is, to raise the atomic energy level from L3 to L1. If atomic energy Level 3 were not the ground state, it is also necessary to include an additional pumping device, in the pump 15, so as to excite the medium up to the Level L3.

In one form of the invention, classical laser operation is employed, that is, a population inversion is established at the atomic energy level L1 in a laser cavity 10. With this type of operation the output wavelength is independent of the tuning of the pump 15, and therefore, the laser cavity itself is tuned by employing the Zeeman and/or Stark effect; that is, application of magnetic or electric fields to the laser cavity 10. In other embodiments of the invention, a popultion inversion is not established, and radiation is produced by stimulated Raman scattering. In this class of operation, tuning is effected by tuning one or more of the pumping devices included within the pump 15.

The medium included in the laser cavity 10 may be chosen from a wide variety of materials. The embodiments disclosed below rely on potassium or strontium in the gaseous phase. In this application where wavelengths are referred to, they are in air.

Embodiment 1

FIGS. 2A and 2B are respectively an energy level diagram and a block diagram of a physical arrangement employing the principles of the present invention with a potassium vapor cell to produce intense tunable coherent radiation at 628 cm.$^{-1}$.

In particular, as shown in FIG. 2A, potassium is raised from its ground state ($4S_{\frac{1}{2}}$) to the $4P_{\frac{1}{2}}$ level by a suitable pumping device, which will be disclosed hereinafter. With number densities for the potassium vapor on the order of $10^{16}$ atom/cm.$^3$, severe radiative trapping will occur and the effective lifetime of the excitation in the $4P_{\frac{1}{2}}$ level can be lengthened from 30 nsec. to the order of 1 msec. These number densities can be achieved, for example, at a pressure of 1 Torr and a temperature of 350° C. These values are exemplary and wide variations can be accommodated if changes in input power levels are made. For instance, a cw. laser pumping beam tuned to the transition at 12985.2 cm.$^{-1}$ can be employed. With a power of 260 mW it can easily maintain $10^{15}$ atoms in the excited state. A second pumping device optically pumps the potassium (in pulse fashion) with power resonant with the $4P_{\frac{1}{2}} \rightarrow 6D_{3/2}$ transistion, i.e., the frequency corresponding to 18710.6 cm.$^{-1}$ (5343.1 Å). With this pumping we can saturate the $6D_{3/2}$ level, i.e., a number density of about $0.5\times10^{15}$ atoms/cm.$^3$. With this material the branching ratio is such that the highest gain is for the $6D_{3/2}\rightarrow 7P_{\frac{1}{2}}$ transition and a single frequency output is expected.

For tuning purposes, the Stark effect is employed and application of a relatively strong electric field to the potassium vapor should allow for tuning several cm.$^{-1}$ in a continuous fashion. Alternatively, the Zeeman effect would also allow for continuous tuning of the output by several cm.$^{-1}$ (i.e., $\pm 6$ cm.$^{-1}$).

It should be noted that the pulsed pumping of the $4P_{\frac{1}{2}}$ to $6D_{3/2}$ transition allows relatively higher electric fields to be applied without ionizing the vapor and thus due to Stark effect can be very extensive.

Employing the Stark effect requires some means to subject the medium in the laser cavity 10 to an electric field. Therefore, tuning means 20 (FIG. 1B), for this embodiment, includes electric field generating means such as a pair of plates preferably mounted within the cavity 10 to subject the medium therein to the electric field. Suitable power supplies synchronized with the optical pumping energizes the electrodes to produce the necessary electric field. In like fashion, employment of the Zeeman effect necessitates subjecting the medium in the laser cavity 10 to a magnetic field, and thus tuning means 20 (FIG. 1B), for this embodiment, includes a means for generating such a magnetic field, such as a coil, which may be mounted outside the cavity 10.

A typical apparatus embodying the example referred to above is illustrated in FIG. 2B. In this Figure, a laser cavity 30 is associated with a pair of mirrors, 31 and 32. Mirror 32 is the output mirror. Laser cavity 30 is pumped by a 7699.0 Å CW beam and a pulsed 5343.1 Å beam through a Dichroic mirror 31. Mirror 31 has reflectance at 16μ and is transmitting at 7699.0 Å and 5343.1 Å. Also included within the laser cavity 30 are electrodes 35 which are coupled to electric field generator 20' for tuning purposes. As explained above, the electric field generator 20' is synchronized with the pulsed 5343.1 Å beam to allow tuning with the Stark effect. Finally, potassium in the vapor phase is also included within the laser cavity 30.

In operation, K atoms within cavity 30 are excited to the $4P_{\frac{1}{2}}$ level by the 7699.0 Å beam. From this level the atoms are excited to $6D_{3/2}$ in response to the 5343.1 Å pulsed pumping. The long lifetime at $4P_{\frac{1}{2}}$ allows a population inversion to be established at $6D_{3/2}$. The transition from $6D_{3/2}$ to $7P_{\frac{1}{2}}$ is the most favored transition from $6D_{3/2}$ and will produce radiation at 625.8 cm.$^{-1}$. The tuning means, electrical field generator 20' or a magnetic field generator, should allow tuning within a range 620 cm.$^{-1}$ to 632 cm.$^{-1}$ and more particularly to the desired 628 cm.$^{-1}$.

Figure 3:
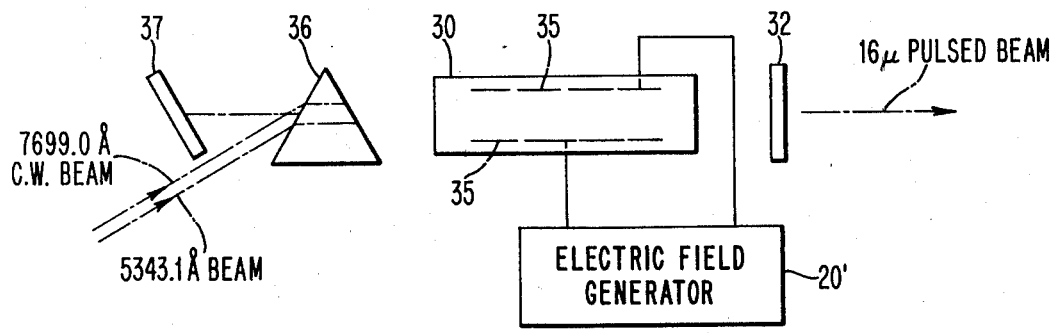

A different pumping scheme employing the same transitions is illustrated in FIG. 3. FIG. 3 illustrates much of the same apparatus as FIG. 2 except that the mirror 31 has been replaced by a mirror 37 which need only have reflectance at 16μ, and need not be transmitting to the c.w. or pulsed pumping beams. Rather, these beams are directed to a KCl prism 36 where they are properly directed into the laser cavity 30 to be co-linear with the 16μ laser beam. In operation, the apparatus of FIG. 3 employs the same transitions to produce the 16μ output as does the apparatus of FIG. 2.

Figure 4:
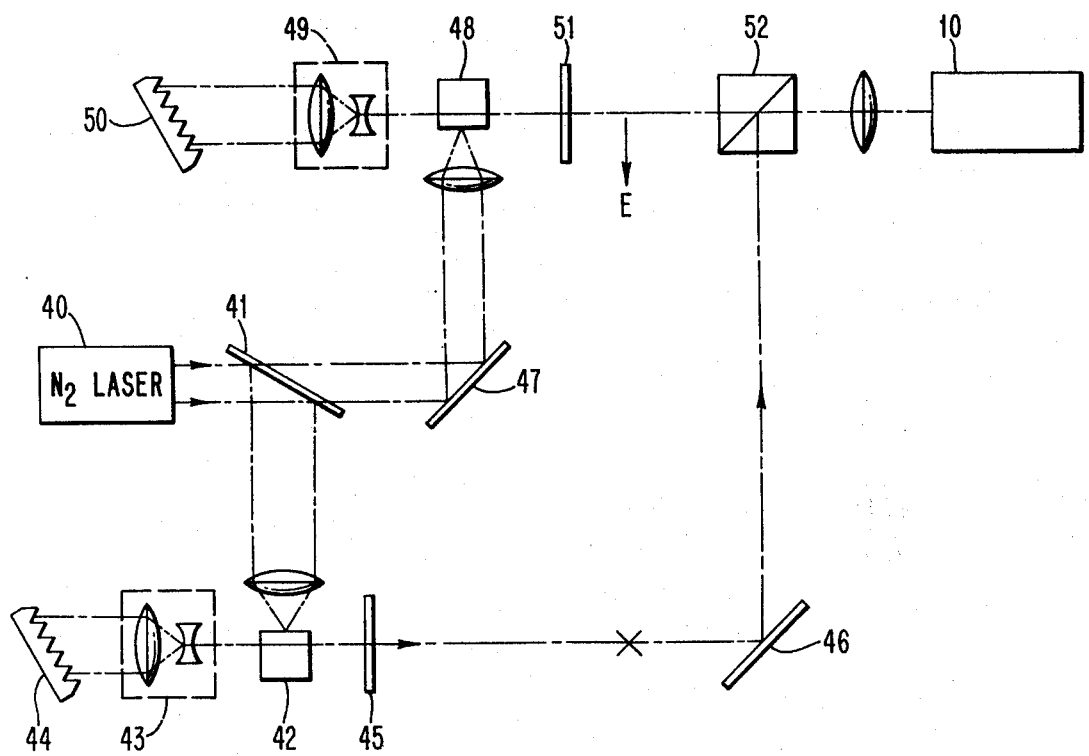

As a further alternative pumping scheme, a pair of dye lasers can be employed, one producing the 7699.0 Å energy and the second producing the 5343.1 Å energy. The outputs from the dye cells can be pulsed and can be synchronously produced if each of the dye cells is itself pumped by a common nitrogen laser, as illustrated in FIG. 1 of "A Tunable Infrared Coherent Source for the 2 to 25μ Region and Beyond" by Wynne, Sorokin and Lankard, at pages 103–111 of the book, *Laser Spectroscopy*, edited by Brewer and Mooradian (Plenum Publishing Corp., New York, New York 1974). Thus, as shown in FIG. 4, the nitrogen laser 40 produces a suitable output at wavelength 3371 Å, which is divided by beam splitter 41. Associated with dye laser 42 is a beam expander 43 and grating 44 allowing a spectrally narrow (about 0.1 cm.$^{-1}$) tunable output. The other portion of the nitrogen laser beam is reflected by the reflector 47 to pump a different dye cell 48. Associated with dye cell 48 is a beam expander 49 and grating 50. The pulsed outputs of both dye cells 42 and 48 are combined in the Glan prism 52 for purposes of pumping the laser cavity 10. For instance, dye cell 48 can produce the 7699.0 Å beam and dye cell 42 can produce the 5343.1 Å beam. With this apparatus the K atoms are excited to $6D_{3/2}$ and then decay to the $7D_{\frac{1}{2}}$ level with the emission at 625.8 cm.$^{-1}$. Tuning should allow this to be sifted in the range 620 cm.$^{-1}$ to 632 cm.$^{-1}$.

Figure 5A:
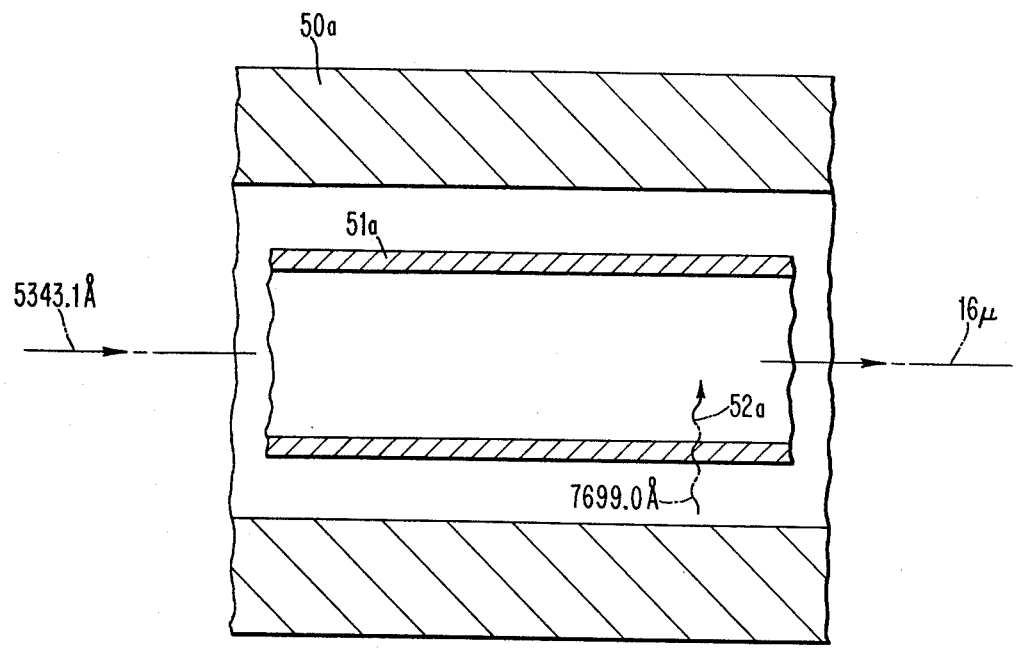

As still a further pumping alternative to produce 16μ radiation employing the same transitions, an incoherent light pump from a coaxial discharge in K vapor is employed to insure high population density in the $4P_{\frac{1}{2}}$ (as well as the $4P_{3/2}$) states. Interior of the coaxial discharge tube is a central column of K vapor. The vapor pressure in the outer tube is adjusted so that the emission width of the K resonance lines equals the resonance broadened absorption width of the atoms in the inner tube. FIG. 5A is a cross section of apparatus to perform such pumping. More particularly, the outer tube wall 50a encloses an interior tube comprising a wall 51a of a material transparent to the radiation emitted by the potassium vapor in the outer tube, i.e., 7699.0 Å. Enclosed within the walls 51 of the inner tube is additional potassium vapor which is subjected to 5343.1 Å radiation from an external source. The arrow 52a illustrates the spontaneous emission due to the electrically excited potassium atoms in the outer tube. This latter radiation pumps the potassium in the inner tube to the $4P_{\frac{1}{2}}$ state. The 5343.1 Å radiation incident on the potassium vapor in the inner tube pumps the excited atoms up to the $6D_{3/2}$ state. As is mentioned above, the most favored transition from the $6D_{3/2}$ is to the $7P_{\frac{1}{2}}$ producing 625.8 cm.$^{-1}$ radiation, the desired output.

For tuning purposes, with this pumping scheme, the Stark or Zeeman effects are employed with apparatus such as is illustrated in FIGS. 2 and 3. This should allow tuning in the range 620 cm.$^{-1}$ to 632 cm.$^{-1}$.

As still a further pumping alternative and one which we have employed, to produce 16μ laser radiation employing the same transitions, a heat pipe discharge tube may be used to insure a high population density in the $4P_{\frac{1}{2}}$ and $4P_{3/2}$ states. Such a discharge tube is disclosed, for instance, in U.S. Pat. No. 3,654,567 issued Apr. 4, 1972, or "Emission Spectra of Alkali Metal Molecules Observed with a Heat Pipe Discharge Tube," by P. P. Sorokin and J. Lankard in the *Journal of Chemical Physics*, Vol. 55, No. 8, Oct. 15, 1971, pages 3810–3813.

Figure 5B:
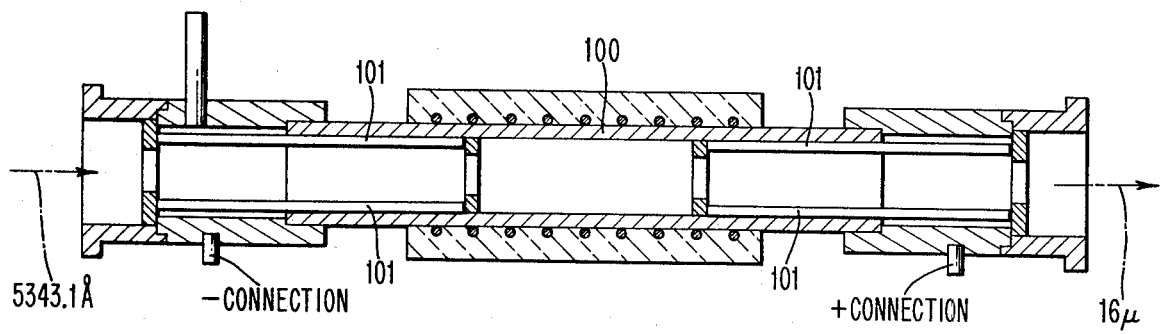

The heat pipe discharge tube is shown in cross section in FIG. 5B with a central column of K vapor. The vapor pressure is adjusted so that a glow discharge is supported in the K vapor and a sufficient density of K atoms in the 4P$_{\frac{1}{2}}$ and 4P$_{3/2}$ states results. The outer tube wall 100 encloses the vapor. A current is passed through electrodes 101 to excite atoms to the 4P$_{\frac{1}{2}}$ and 4P$_{3/2}$ state. These states are subjected to 5343.1 Å radiation from an external source. The 5343.1 Å radiation pumps the excited atoms in the 4P$_{\frac{1}{2}}$ state to up to the 6D$_{3/2}$ state. As mentioned above, the most favored transition from the 6D$_{3/2}$ state is to the 7P$_{\frac{1}{2}}$ state producing 625.8 cm.$^{-1}$ radiation, the desired output.

Embodiment 2

As a further example, instead of employing potassium vapor, strontium vapor can be employed.

Figure 7A:
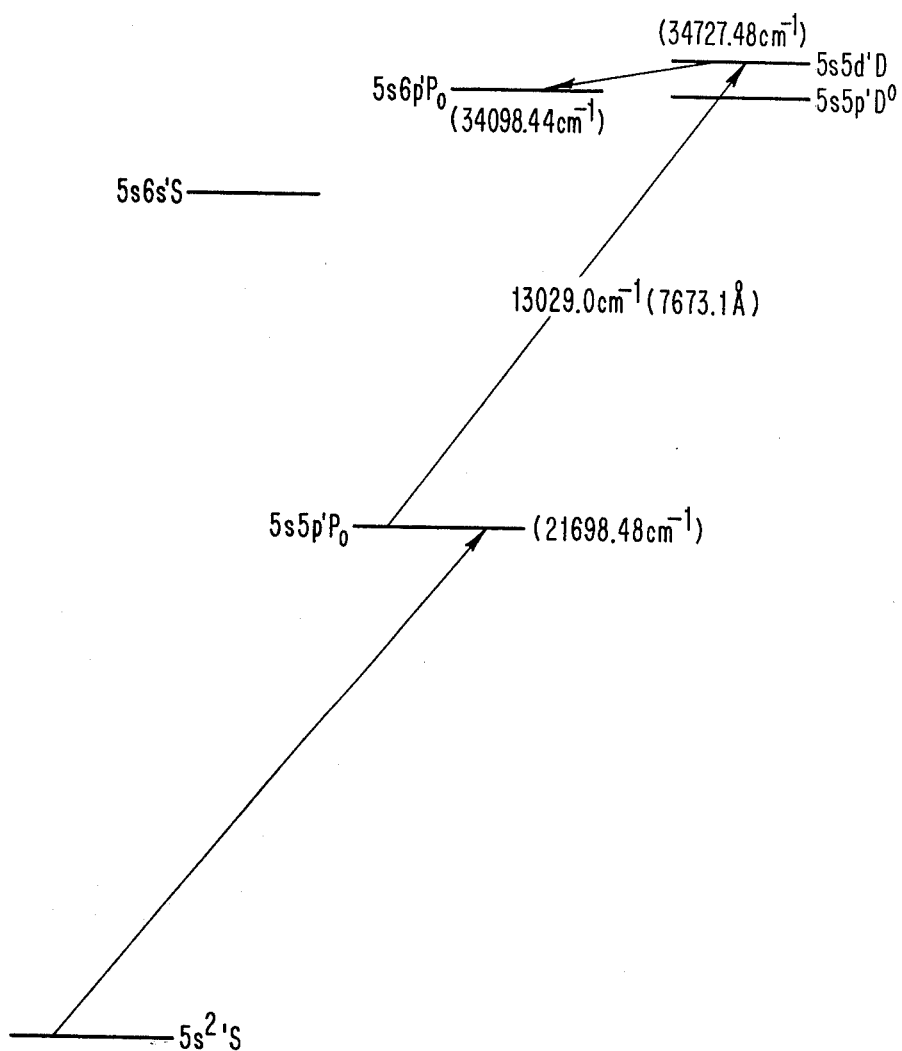
FIG. 7A is an energy level diagram of atomic Sr.
Figure 7B:
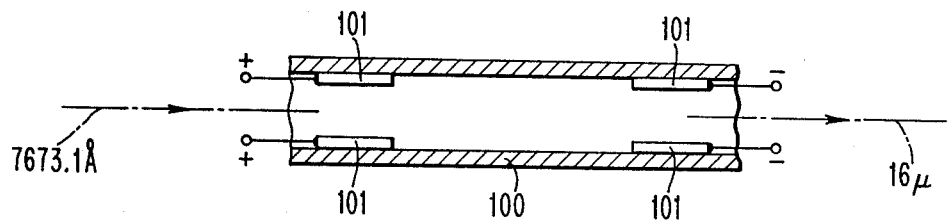
FIG. 7B is a schematic diagram of apparatus embodying our invention.

FIGS. 7A and 7B are, respectively, an energy level diagram and a block diagram of a physical arrangement employing the principles of the present invention with a strontium vapor cell to produce intense tunable coherent radiation at 628 cm.$^{-1}$. More particularly, strontium is excited from the ground (5s$^{2\prime}$S) state to the 5s$^\prime$P$_o$ level. This pumping can be provided by an electrical discharge such as that employed in FIG. 5B. An optical pump (for example, a laser) pulses the excited atoms at 13029.0 cm.$^{-1}$ (7677.3 Å) to populate the 5s5d$^\prime$D state. In this fashion, an inverted population density is established with respect to the 5s6p$^\prime$P$_o$ state resulting in lasing at 629 cm.$^{-1}$. Tuning to the desired wavelength is accomplsihed with an electric or magnetic field, as previously disclosed.

FIG. 7B shows, schematically, a heat pipe discharge tube 100 (similar to FIG. 5B) enclosing strontium vapor subjected to an electrical discharge as a result of a potential difference applied between terminals + and − connected to electrodes 101. An optical pump provides 7677.3 Å radiation to excite the atoms to the 5s5d$^\prime$D state. The transition from this state to 5s6p$^\prime$P$_o$ is most favored and lasing at 629 cm.$^{-1}$ results. Although specific tuning apparatus is not illustrated, the Stark or Zeeman effects will allow tuning of approximately ±6 cm.$^{-1}$ to achieve the desired 628 cm.$^{-1}$ output.

Although only a single pumping arrangement for strontium is shown herein, those skilled in the art will be able to readily adapt the specific pumping arrangements of FIGS. 2B, 3, 4, 5A and 5B to the strontium vapor embodiment.

Embodiment 3

The previous examples, empolying potassium and strontium for producing 16$\mu$ intense tunable coherent radiation, have been based upon classical laser techniques in which an inverted population is achieved from which the most favored transition produces the desired output with tuning. Our invention, however, also produces the desired radiation, using similar materials and transition levels, but it need not establish the inverted population and may, instead, rely upon stimulated Raman scattering (hereinafter SRS). In this process, tuning is achieved by varying the wavelength of the pumping source rather than tuning the cavity or the medium therein. Thus, the SRS process corresponds to employing a tuning means 20 to tune the pump 15 rather than the laser cavity 10 (see FIG. 1B).

Figure 6A:
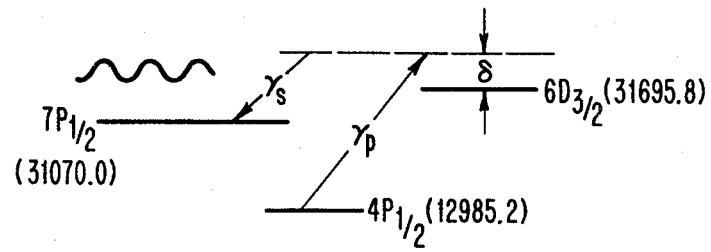
FIGS. 6A and 6B are energy level diagrams of SRS processes embodying our invention.

For example, FIG. 6A shows certain of the relevant energy levels of potassium, the 4S$_{\frac{1}{2}}$ or the ground state, and intermediate excited level 4P$_{\frac{1}{2}}$, a further excited state 6D$_{3/2}$ and another excited state, 7P$_{\frac{1}{2}}$ along with the wave numbers associated with those states. In employing SRS the 4P$_{\frac{1}{2}}$ level is first populated by using any of the apparatus previously referred to. For example, an intense laser pulse near 7699.0 Å or by means of the heat pipe discharge or a nitrogen laser pumped dye laser. In the second step an intense narrow band laser pulse of wavelength $\lambda_p$ is employed which is slightly different from that necessary to populate the 6D$_{3/2}$ level. Of course, the second pumping beam must be applied before the atoms pumped to the 4P$_{\frac{1}{2}}$ state have had a chance to decay back to ground state, but this is a requirement in common with the examples in the preceding discussion.

A 16$\mu$ output is generated as a so-called Stokes wave based upon the simultaneous occurrence of the following events:

(1) a pump photon at $\lambda_p$ (wave number $\lambda_p$) is absorbed;

(2) a Stokes photon at $\lambda_s$ (wave number $\nu_s$) is emitted; and (3) the atom interacting with the radiation fields, in this case an atom in the potassium 4P$_{\frac{1}{2}}$ state makes an energy conserving transition by jumping to another state, here the 7P$_{\frac{1}{2}}$. Thus, $\nu_p = \nu_s + 31070.0$ cm.$^{-1}$ − 12985.2 cm.$^{-1}$. For example, if the exact value desired for $\nu_s$ is 628 cm.$^{-1}$, $\nu_p$ should be 18712.8 cm.$^{-1}$, which corresponds to 5342.6 Å. The normal wavelength for resonance between the 4P$_{\frac{1}{2}}$ and 6D$_{3/2}$ states is 5343.1 Å so that it is clear that the laser pumping of the second step must be tuned to a slightly shorter wavelength (or a greater wave number for energy of photons) than that of the transition employed to reach the 6D$_{3/2}$ state. In FIG. 6A this slight energy difference is represented by $\delta$, and here $\delta$ is 2.2 cm.$^{-1}$.

It should be apparent from the foregoing example, however, that any specific wavelength near 16$\mu$ can be produced since the second pumping step can employ a tunable dye laser to produce $\nu_p$. However, for any given value of $\delta$ the SRS process has a threshold, that is, there is a minimum value of intensity of the beam $\nu_p$ which must be supplied before the process produces the desired output. This threshold varies as the square of delta and depends also on the combined radiative strengths of the atomic transitions from which the cross section of the Raman scattering process is derived. In this case, 4P−6D and 6D−7P.

The SRS radiation has been observed in potassium, although at energy levels different from those employed in this invention, see "Resonance Raman Effect in Free Atoms of Potassium" by Rokni and Yatsiv, appearing in *Physics Letters*, Vol. 24A, No. 5 (Feb. 27, 1967) pages 277–78. These reported results serve to establish that a threshold level for the process illustrated in FIG. 6A is practicable and attainable. That is, the value of $\delta$ employed in the referenced article is four times bigger than that employed in the process of FIG. 6A. Therefore, the threshold for SRS in the case reported in this article should be some 16 times that for the process of FIG. 6A. The fact that SRS was observed in the reported case for the modest intensity for the beam at $\nu_p$ serves as evidence that the threshold for the process of FIG. 6A is indeed practical.

Thus, it should be apparent that the example given herein allows employing a potassium vapor to produce intense coherent radiation in the vicinity of 16$\mu$, moreover which radiation is tunable by varying the pumping frequency $\nu_p$. With a dye laser to produce $\nu_p$ it would appear simple to obtain the necessary tuning.

The preceding example of the SRS process can be characterized as a two photon process ($\nu_p$, and $\nu_s$). This is not essential and this will be demonstrated by describing a three photon process ($\nu_{p1}$, $\nu_{p2}$ and $\nu_s$) for producing tunable intense coherent radiation at 16μ.

Figure 6B:
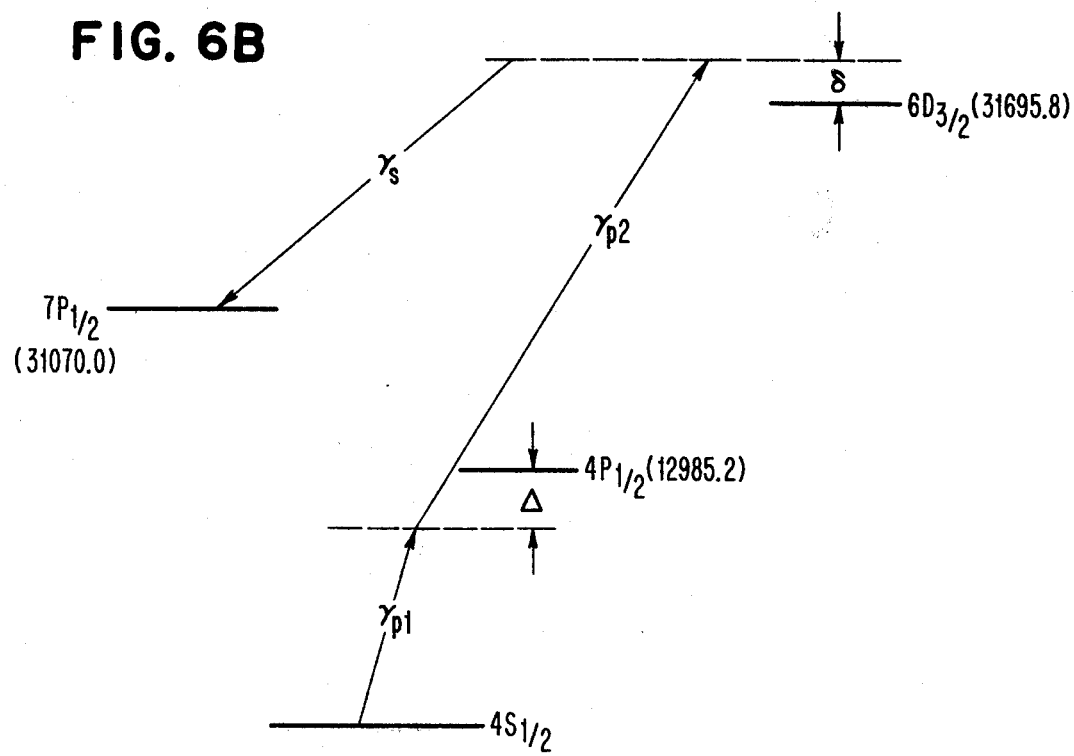

FIG. 6B illustrates the three photon process which operates on K atoms in the ground state. Here two laser beams provide pumping energy, one at $\nu_{p1}$ and the second at $\nu_{p2}$. Coherent stimulation occurs when the beam intensities are sufficiently high. The process relies upon the following simultaneous events:

(1) a pump photon at $\nu_{p1}$, is absorbed;
(2) a pump photon at $\nu_{p2}$, is absorbed;
(3) a Stokes photon at $\nu_s$ is emitted; and
(4) an atom in the ground state $4S_{\frac{1}{2}}$ interacting with the radiation fields makes an energy conserving jump to $7P_{\frac{1}{2}}$ state.

In this process the $4P_{\frac{1}{2}}$ state is not directly involved, except in the subsequent decay to the ground state. The $4P_{\frac{1}{2}}$ state does, however, serve as a close-lying state required to give the three photon Raman scattering process a reasonably large possibility of occurrence or, alternatively expressed, a relatively large "cross section." This probability is proportional to $(1/\Delta^2)(1/\delta^2)$.

In general, the laser beams $\nu_{p1}$, $\nu_{p2}$ must be tunable around the frequencies of the $4S_{\frac{1}{2}}$ to $4P_{178}$ resonance line and the $4P_{178}$ to $6D_{3/2}$ transition, respectively. There is, of course, an exact requirement that $\nu_{p1} + \nu_{p2} - \nu_s = 31070.0$ cm.$^{-1}$. Thus, for example, if it is desired that $\nu_s = 628.0$ cm.$^{-1}$, $\nu_{p1}$ and $\nu_{p2}$ must be sum to 31698 cm.$^{-1}$. (The quantity $\delta$ of FIG. 6B would be the same as the quantity $\delta$ of FIG. 6A, in other words.) Otherwise, there is some flexibility in the choice of the input beam frequencies. Whereas $\delta$ (in FIG. 6B) will be $\approx 2.2$ cm.$^{-1}$ for $\nu_s \approx 628$ cm.$^{-1}$, a typical value of $\Delta$ will be $\sim 10\text{-}100$ cm.$^{-1}$, so as not to have too much of the primary beam at $\nu_{p1}$ actually absorbed.

Although we have used potassium in the example of the SRS process to produce 16μ radiation, this process can also employ strontium.

What is claimed is:

1. A source of intense coherent radiation in the range of 620 cm.$^{-1}$ to 632 cm.$^{-1}$ comprising:
   a potassium vapor containing cavity defined by walls transmissive of pumping and emitted energy,
   pumping means including at least one optical pumping source for pumping said potassium to a $6D3/2$ level to establish an inverted population density at said $6D3/2$ potassium level.

2. The apparatus of claim 1 in which said pumping means includes
   first pump means to populate a $4P\frac{1}{2}$ level and second pump means to excite potassium from said $4P\frac{1}{2}$ level to said $6D3/2$ level.

3. The apparatus of claim 2 wherein
   said first and second pump means comprise first and second dye lasers and nitrogen laser means for synchronously pumping said first and second dye lasers.

4. The apparatus of claim 1 which includes means for applying an electric or magnetic field to potassium within said cavity
   whereby tuning is achieved by selecting the amplitude of said electric or magnetic field.

5. The apparatus of claim 4 in which said means for applying a field comprises means for applying an electric field.

6. The apparatus of claim 4 in which said means for applying a field comprises means for applying a magnetic field.

7. The apparatus of claim 1 in which said pumping means further includes an electrically pumped discharge tube surrounding said cavity emitting at 7699.0 Å.

8. The apparatus of claim 1 in which said pumping means further includes a heat pipe means for emitting incoherently at 7699 Å.

9. An off-resonance pumped source of intense coherent radiation in the range of 620 cm.$^{-1}$ to 632 cm.$^{-1}$ comprising
   a potassium vapor containing cavity defined by walls transmissive of pumping and emitted energy,
   pumping means including at least one optical pumping source for exciting potassium in said cavity slightly off resonance of a $4P\frac{1}{2}$ to $6D3/2$ transition.
   whereby tuning is achieved by varying the difference between energy emitted by said pumping means and resonant pumping.

10. The apparatus of claim 9 in which said pumping means includes first pump means to excite said potassium to said $4P\frac{1}{2}$ level and second pump means to excite potassium by energy slightly off resonant from said $4P\frac{1}{2}$ to $6D3/2$ transition.

11. The apparatus of claim 10 in which said second pump means excites potassium with energy about 2 cm.$^{-1}$ different from that necessary for a $4P\frac{1}{2}$ to $6D3/2$ transition.

12. The apparatus of claim 9 in which said pumping means includes means to induce a two photon excitation process.

13. The apparatus of claim 9 in which said pumping means includes means to induce a three photon excitation process.

14. The apparatus of claim 9 in which said source is tunable and in which
   said pumping means includes a tunable optical pumping source for exciting potassium off-resonance of said $4P\frac{1}{2}$ to $6D3/2$ transition by a variable quantity.

15. The apparatus of claim 9 in which said pumping means includes
   first pump means to excite said potassium off-resonant of a $4S\frac{1}{2}$ to $4P\frac{1}{2}$ transition by a selectable amount, and
   second pump means to excite said potassium off-resonant of a $4P\frac{1}{2}$ to $6D3/2$ transition by a selectable amount,
   whereby resultant excitation of said first and second pump means produces energy in the form of a Stokes photon at a level in the vicinity of 628 cm.$^{-1}$.

16. A source of intense coherent radiation in the range of 620 cm.$^{-1}$ to 632 cm.$^{-1}$ comprising
   a strontium vapor containing cavity defined by walls transmissive of pumping and emitted energy,
   puming means including at least one optical pumping source for pumping said strontium to a 5s5d'D level, to establish an inverted population density at said 5s5d'D level.

17. The apparatus of claim 16 in which said pumping means comprises first pump means to populate a 5s5p 'Po level and second pump means to excite strontium from said 5s5p 'Po level to said 5s5d 'D level.

18. The apparatus of claim 17 in which said first pump means comprises
   an electrically pumped heat pipe discharge tube, and
   said second pump means comprises a laser directing pulsed optical energy at said cavity to populate said 5s5d 'D level from said populated 5s5d 'Po level.

19. The apparatus of claim 16 which further comprises means for applying an electric or magnetic field to said strontium in said cavity, whereby tuning is achieved by selecting the amplitude of said electric or magnetic field.

20. The apparatus of claim 19 in which said means for applying an electric or magnetic field produces an electric field.

21. The apparatus of claim 19 in which said means for applying an electric or magnetic field produces a magnetic field.

22. An off resonance pumped source of intense coherent radiation in the range 620 cm.$^{-1}$ to 632 cm.$^{-1}$ comprising a strontium vapor containing cavity defind by walls transmissive of puming and emitted energy, puming means including at least one optical pumping source for exciting stronitum in said cavity slightly off resonance of a 5s5p 'Po to 5s5d 'D transition.

23. The apparatus of claim 22 in which said pumping means includes first pump means to excite strontium to said 5s5p 'Po level and second pump means to excite strontium by energy off resonant from said 5s5p 'Po to 5s5d 'D transition.

24. The apparatus of claim 22 in which said pumping means includes means to induce a two photon excitation process.

25. The apparatus of claim 22 in which said pumping means includes means to induce a three photon excitation process.

26. The apparatus of claim 22 which comprises a tunable source and in which said pumping means comprises a tunable optical pumping source for exciting strontium off-resonance of said 5s5p 'Po to 5s5d 'D transition by a variable quantity.

* * * * *

UNITED STATES PATENT AND TRADEMARK OFFICE
CERTIFICATE OF CORRECTION

PATENT NO. : 4,264,877
DATED : April 28, 1981
INVENTOR(S) : Grischkowsky et al

It is certified that error appears in the above—identified patent and that said Letters Patent is hereby corrected as shown below:

In the Abstract, line 3, delete "optical".

Col. 1, line 7, change "may" to --May--.

Col. 2, line 23, correct the spelling of "invention".

Col. 3, line 41, change "selftrapping" to --self-trapping--;

line 43, correct the spelling of "provide".

Col. 6, line 24, change "sifted" to --shifted--;

line 40, change "51" to --51a--;

line 61, change "or" to --for--.

Col. 8, line 8, before "ground" insert --the--;

line 14, change "$\lambda_p$" (second occurrence) to --$\nu_p$--.

Col. 9, lines 24 and 25, change "$4P_{178}$" to --$4P_{1/2}$--.

Col. 10, line 55, change "puming" to --pumping--.

Col. 11, line 21, change "puming" to --pumping--.

UNITED STATES PATENT AND TRADEMARK OFFICE
CERTIFICATE OF CORRECTION

PATENT NO. : 4,264,877
DATED : April 28, 1981
INVENTOR(S) : Grischkowsky et al

It is certified that error appears in the above—identified patent and that said Letters Patent is hereby corrected as shown below:

Col. 12, line 1, change "puming" to --pumping--;

line 2, correct the spelling of "strontium".

Signed and Sealed this

Eighth Day of September 1981

[SEAL]

Attest:

GERALD J. MOSSINGHOFF

Attesting Officer     Commissioner of Patents and Trademarks